United States Patent [15] 3,665,412

Briand [45] May 23, 1972

[54] NUMERICAL DATA MULTI-PROCESSOR SYSTEM

[72] Inventor: Roger H. Briand, Versailles, France

[73] Assignee: Compagnie Internationale Pour l'Informatique, Louveciennes, France

[22] Filed: July 20, 1970

[21] Appl. No.: 56,285

[52] U.S. Cl. ....................340/172.5
[51] Int. Cl. ....................G06f 9/18
[58] Field of Search ....................340/172.5

[56] References Cited

UNITED STATES PATENTS 3,309,672 3/1967 Brun et al. ....................340/172.5
3,395,394 7/1968 Cottrell, Jr. ....................340/172.5

*Primary Examiner*—Raulfe B. Zache
*Attorney*—Kemon, Palmer & Estabrook

[57] ABSTRACT

A numerical data processing system is disclosed which is comprised of a general large capacity information store and a plurality of processors selectively connectable to as many access channels of said store from the selective activation of as many store access calling lines. Part at least of said processors are provided with additional store access calling lines which are associated with hardware equipment for organizing a hierarchy of priority conflicting access calls from said processors to said store.

11 Claims, 4 Drawing Figures

INVENTOR
Roger H. Briand

Kemon, Palmer & Estabrook
ATTORNEYS

PATENTED MAY 23 1972 3,665,412

INVENTOR
Roger H. Briand
Kemon, Palmer & Estabrook
ATTORNEYS

PATENTED MAY 23 1972 3,665,412

INVENTOR
Roger H. Briand

Kemon, Palmer & Estabrook
ATTORNEYS

INVENTOR
Roger H. Briand
Kemon, Palmer & Estabrook
ATTORNEYS

NUMERICAL DATA MULTI-PROCESSOR SYSTEM

BACKGROUND OF THE INVENTION

Numerical data processing systems are known which comprise the association of a large capacity information store with a plurality of processor units which are connectable to said store for two-way information exchanges. One at least of said processor units, which may be said to be a "central unit," consists of a program controlled numerical computer and the other processor units consist of data exchange units between the general store and external units, commonly called peripheral units, peripherals for short. When an exchange processor unit only connects a single peripheral in the system, it is said to be a direct exchange unit. When an exchange processor unit serves several peripherals, through as many secondary exchange units, i.e. peripheral connecting units, it is considered as a peripheral multiplexing unit in the system. As presently, a larger and larger number of peripherals is deemed necessary in a data processing system, two such multiplexing units may be established on the basis of a "party-line" access to the store which, of course, only presents a finite number of access channels to the associated processor units.

It is conventional in such systems to provide for a hierarchy of the store access channels. Up to now, such a hierarchy has been based on the following assumptions: whereas a central unit may, during execution of program instructions, be "-frozen" while awaiting a connection to the general store during a relatively lenghty time interval without its operation being actually disturbed, any exchange unit cannot, when operating for information transfer between the store and one or more peripheral equipments of the fast operation type including an electro-mechanical organization, such as magnetic discs or drums, wait for obtaining an access channel of the store without serious risk of information loss. Under such condition, the exchange units were connected to the store access channels which were on the "top" of such a hierarchy and the central units were connected to the access channels of the lowest ranks in said hierarchy.

Such an organization presents several difficulties: it slows the operations in the central units, hence it lowers the efficiency of the system, including that of the general store, but, as the defined hierarchy is rigid, information losses are still possible in the operation of the exchange units.

BRIEF SUMMARY OF THE INVENTION

It is an object of the present invention to provide a numerical data processing system of the above defined general organization wherein, while preserving the principle of a hierarchy of the store access channels, such drawbacks are eliminated by the provision of hardware equipment permanently reorganizing the said hierarchy for conflicting store access calls on a dynamic basis, i.e. permanently taking into account the evolution with respect to the time of the needs of priority access calls from the processor units to the general store.

In accordance with the present invention, the "normal" access calling lines of the processor units are associated with, at least for part of said units, "high priority" access calling lines, means are provided in such units responsive to local conditions for activation of said "high priority" access calling lines, and a device is provided in the access channel arrangement of the store for interpretation of activations of said second "high priority" lines and subsequent connection of a processor unit wherein a high priority line has been activated to a high priority access channel in said access channel arrangement of the store.

Further in accordance with the present invention said access call interpretative device is so designed as to maintain a hierarchy of the store access channels as well for normal as for high priority calls and to control, when necessary, such a hierarchy during the execution of a store operation cycle which has been initiated under the first mentioned hierarchy.

In said normal hierarchy, however, the more "normal" priority access channels are those corresponding to central units in the system.

BRIEF DESCRIPTION OF THE DRAWINGS

In the accompanying drawings.

DETAILED DESCRIPTION OF THE INVENTION

Figure 1:
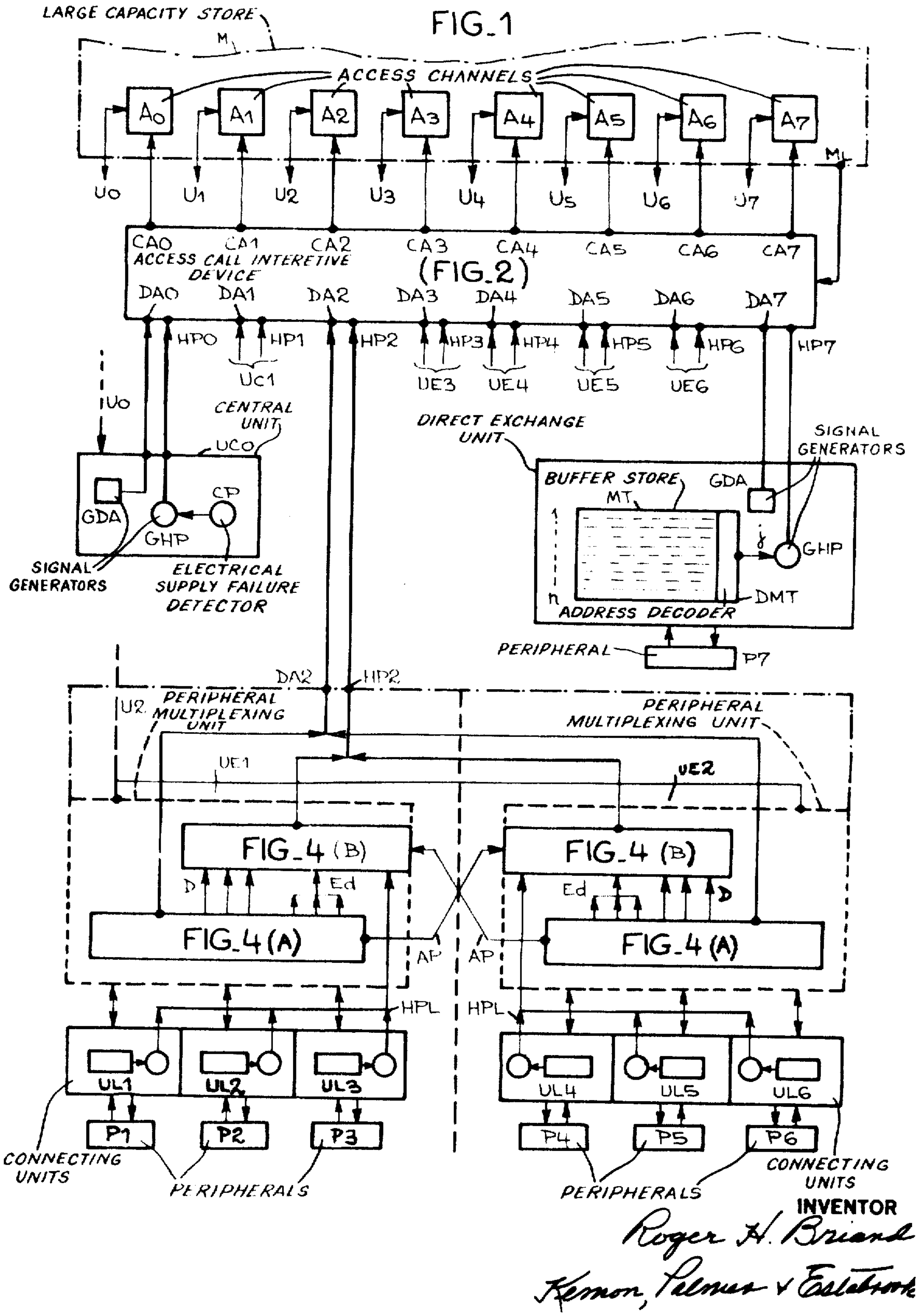
FIG. 1 is the general organization of a system in accordance with the present invention.

With reference to FIG. 1, the large capacity store is shown at M as including for purposes of illustration eight access channels, A0 to A7. A0 and A1 respectively cooperate with central units UC0 and UC1. A2 to A7 cooperate with exchange units the complexity of which decreases according to their ranks: A2 and A3 each cooperates with one pair of peripheral multiplexing units UE1 and UE2 which share a single access channel. A4 to A6 respectively cooperate with single multiplexing units and A7, for the purpose of illustration, is shown cooperating with a direct exchange unit between M and a peripheral equipment P7.

Figure 2:
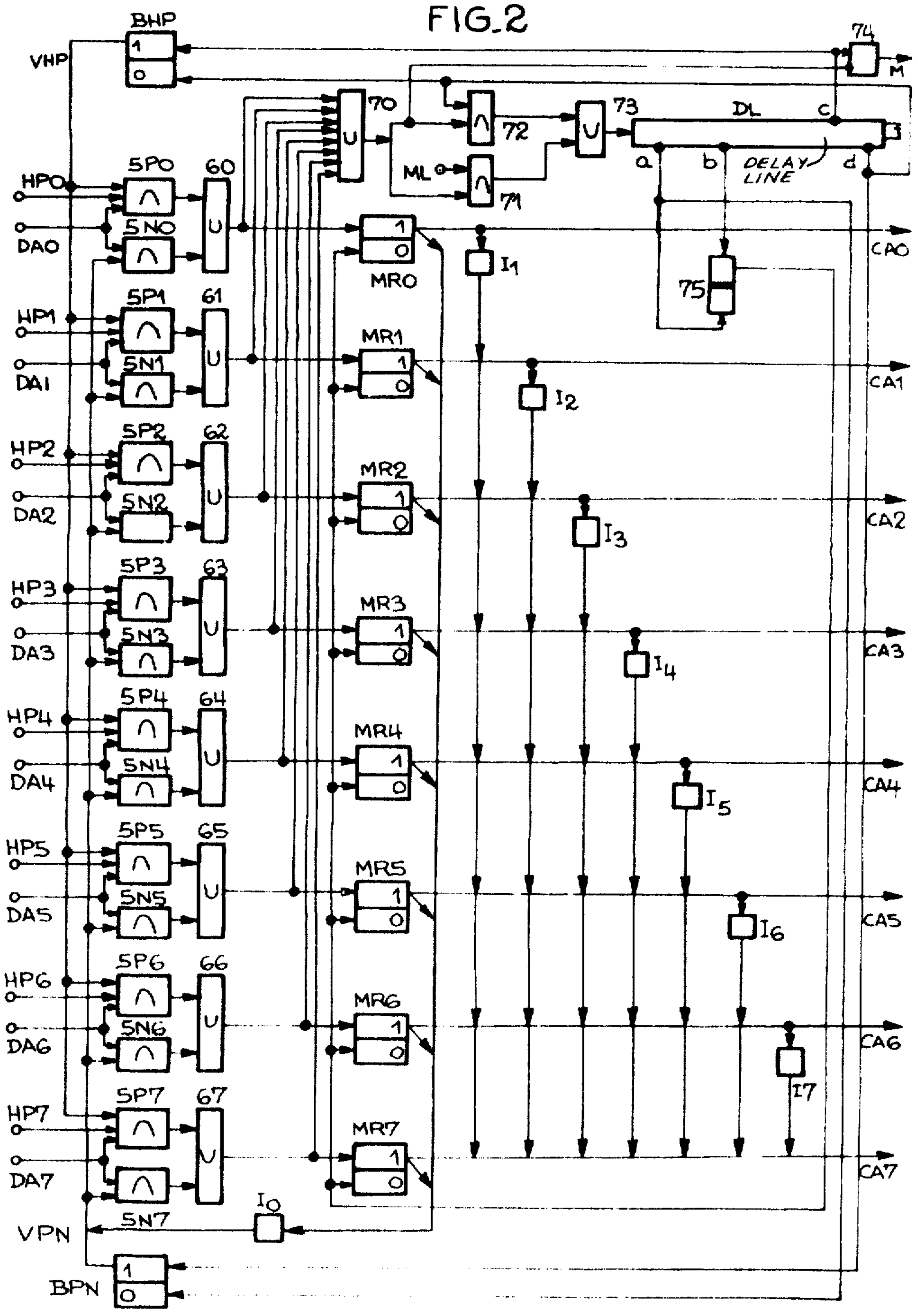
FIG. 2 is an illustrative embodiment of the access call interpretive device of FIG. 1.

The access call interpretative device is shown as a block marked "(FIG. 2)," the detailed arrangement thereof being detailed in said FIG. 2. For the purpose of the description, it presently suffices to note that said device is provided with eight outputs, CA0 to CA7, each controlling, when activated, the control input of the corresponding access channel, A0 to A7, for establishing the corresponding connection, U0 to U7, between the store M and the processors. The very organization of the access channels is conventional and consequently does not necessitate any detailed description. It should be kept in mind that, when an access channel is activated, the normal process is as follows: a store address send by the processor is decoded and a local program is initiated for interconnection of the store to the calling processor. The internal organization of the store M is also conventional as it operates according to exchange cycles and permanently supplies at ML a signal the condition of which indicates that the store is available for a transfer or exchange operation or that the store is not available for such purposes. For purposes of the invention, it may however be of advantage (though this may not be imperative) that part of the control signals for the store operating cycles be controlled from the access call interpretative device. Such an arrangement will be detailed hereinafter.

The access call interpretative device is provided with eight inputs, DA0 to DA7, through which the processors may request an access to the store by activation of their normal access call lines connected to such inputs. The interpretative device is further provided with eight inputs, HP0 to HP7, which are connected to second call lines, i.e. high priority call lines from the processors. In the concerned example, each one of the inputs HP is associated with a corresponding input DA as will be described hereinafter. Consequently the interpretative device will handle all of the calls in normal as well as in a high priority condition. This minimizes the equipment necessary and further ensures a straight-through coordination of the handling of both kinds of store access calls, consequently enhancing the efficiency of the system by speeding up the completion of the calls.

With reference to FIG. 2, the normal access call inputs DA0 with DA7 are respectively associated to the high priority call inputs HP0 to HP7. Each one of the inputs DA0 to DA7 is connected to one input in each one of two AND-circuits, 5N0 and 5P0 for input DA0, 5N1 and 5P1 for input DA1, and so forth. AND-circuits HP have their second inputs respectively connected to the HP inputs of the device. This means that, in the concerned example, whenever one input HP is activated, the corresponding input DA also will be activated. This is not imperative, however, and call lines HP could be activated independantly, in which condition the circuits 5P would not receive the signals on the inputs DA.

The outputs of each pair of circuits 5N and 5P are applied to OR-circuits, 60 to 67. The outputs of said OR-circuits 60 to 67 are respectively connected to activation inputs of one-digit stores, MR0 to MR7. The outputs of said stores are connected to control lines CA0 to CA7 of the access channels A0 to A7 of FIG. 1. The outputs of the one-digit stores MR are further simultaneously applied to the input of an inverter stage 10 for a purpose which will be herein below described. The outputs from OR-circuits 60 are applied to a further OR-gate 70. The output of 70 will be activated each time a call for a "normal" access as well as for a "high priority" access activates one of the inputs of the device.

Each circuit 5P has one of its inputs connected to a bus line VHP from a one-digit store BHP. Each circuit 5N has one of its inputs connected to a bus line VPN from a one-digit store BPN. Said bus line VPN is also connected to the output of inverter stage 10. The conditions of the one-digit stores BPN and BHP are controlled from outputs of a delay line DL. Output *a* of said delay line, in close proximity to its input, is connected to the reset input of BPN. When in reset condition, BPN blocks the input circuits 5N. Output *d* of said delay line is connected to the set input of BPN. When in the set condition, BPN unblocks the input circuits 5N. Output *c* of said delay line is connected to the set input of BHP. When in set condition, BHP unblocks the input circuits 5P. The above mentioned *d* output of the delay line DL is connected to the reset input of BHP. In reset condition, BHP blocks the input circuits 5P. Finally, the condition of a bistable member 75 is controlled from the outputs *a* and *b* of said delay line DL. The output from 75 is directed to inputs of the one-digit stores MR so that, from the activation of output *a* up to the activation of output *b*, said one-digit stores MR are maintained in their "1" condition. Each one-digit store conventionally includes an amplifier the output of which is connected back to one input of the store through a circuit which, when activated from the shown output of 75, "locks" the condition of said amplifier to the condition to which it has been controlled from its actuation input, i.e. the input connected to the concerned one of the OR-circuits 60 to 67. This means that, during the time interval between the activations of the outputs *a* and *b* of the delay line, said amplifier will be maintained in its prior condition, whereas, postwards the activation of *b*, said amplifier will rise to a condition depending on the voltage condition of the output of the corresponding OR-circuit 60 to 67.

The input of the delay line DL receives an activation pulse when one or the other of the following conditions is satisfied: when both the output of the OR-gate 70 and a signal at an input ML are "true," the AND-gate 71 is unblocked and the signal is applied through an OR-circuit 73 to the input of the delay line DL; when both the output of the OR-gate 70 and the output *d* of the delay line DL are "true," the AND-gate 72 is unblocked and applies, through OR-circuit 73, the signal from *d* to the input of the delay line DL.

When the output of 70 is activated concomitantly to the activation of output *c* of the delay line, an AND-gate 74 issues a signal to the store M wherein it will maintain the output ML at a "false" level whereas the output *d* of the delay line would have brought said output ML to the "true" level. The purpose of such an inhibition action will be herein below explained.

It may be noted that, if desired, the delay line DL may be adapted, through additionally provided taps, for substantially controlling all the operations in the store M. Normally in such a store, an operation controlling delay line exists. Providing taps for selection, transfer and actuation operations in the store on the delay line DL may avoid the necessity of duplicating the delay lines in a system according to the invention.

In the device, each time one of the one-digit stores MR is activated, the input circuits 5N are blocked from the output of the inverter 10.

The access organization is provided for a predetermined hierarchy of the "normal" access calls, in the absence of high priority access calls. Said hierarchy is defined, in the example shown, by means of inverters such as shown from I1 to I7 at the outputs of the one-digit stores MR0 to MR7. There actually are seven such inverters as I1, the outputs of which are respectively connected to lines CA1 to CA7, six inverters such as I2 the outputs of which are respectively connected to lines CA2 to CA7, and so forth throughout the hierarchy up to the single inverter I7 the output of which is only connected to line CA7. When MR0 is activated, placing line CA0 at a "true" level for controlling the access channel A0, all the other lines from CA1 to CA7 are maintained at a "false" level, consequently inhibiting the control lines A1 to A7 even when one or more other stores MR than MR0 are activated. When MR0 is not activated and MR1 is activated, lines CA2 to CA7 are maintained at a "false" level; and so forth.

It may be emphasized that, in a system according to the invention, such a hierarchy places the central units first in contradistinction to the prior systems. Such a provision accelerates the work in said central units, UC0 and UC1 in the concerned example, and consequently increases the efficiency of the complete system. Moreover, when a break occurs in the electric supply of a central unit, a high priority store access will be given to said central unit: in such a condition it is imperative, not to lose the benefit of the work in course in said central unit, to take advantage of the fact that the results of such a break of supply are somewhat delayed in the circuits of the central computer unit for enabling said computer to quickly proceed to a one cycle transfer of the data and results into the general information store then existing in said computer unit. Such a transfer operation is conventional per se but, in a conventional arrangement of the hierarchy of the store access channels, a central unit was given the lowest rank priority, hence such a transfer could seldomly be ensured: data and results were lost and the complete work had to be completely re-initiated.

The initiation of a high priority access call in a central unit such as UC0 is plain: in the unit is provided a generator GHP of a voltage suitable for activating the high priority line HP0 when a circuit CP detects a failure of the electrical supply. Said circuit CP is of any well-known kind, for instance a threshold circuit receiving the supply voltage from the mains which, when the amplitude of said voltage decreases to a value lower than its threshold unblocks a gate which applies a battery voltage to said high priority line HP0, said gate and battery constituting the said generator GHP.

The operation of FIG. 2 will now be described. A large capacity store such as M conventionally operates in a continuous sequence of cycles wherein preferably the time intervals devoted to the selection of its access channels preferably partially overlap the store operative cycles. With reference to the device of FIG. 2, this means that any signal ML denoting that the store is available occurs prior to the time that an operative cycle of the store ends and such a signal lasts during a length of time equal to the time interval devoted to a selection operation in the store. When, illustratively, the length of an operative cycle of the store is 650 nanoseconds, and the time interval devoted to selection being 140 nanoseconds, then the delay line DL is provided with a transit time equal to 650 nanoseconds, tap *b* is provided at an interval of 140 nanoseconds from the input or, in other words, from tap *a* which may illustratively be spaced by 7 nanoseconds from the actual input of the delay line. Tap *c* is spaced by 440 nanoseconds from the input and, for instance, tap *d* is spaced by 500 nanoseconds from the input of the delay line. The average length of any pulse issuing from the delay line may be equal to about 60 nanoseconds. The high priority access calls will be serviced during the time intervals wherein ML is "-false," which will shorten the servicing delay for such calls.

Figure 3:
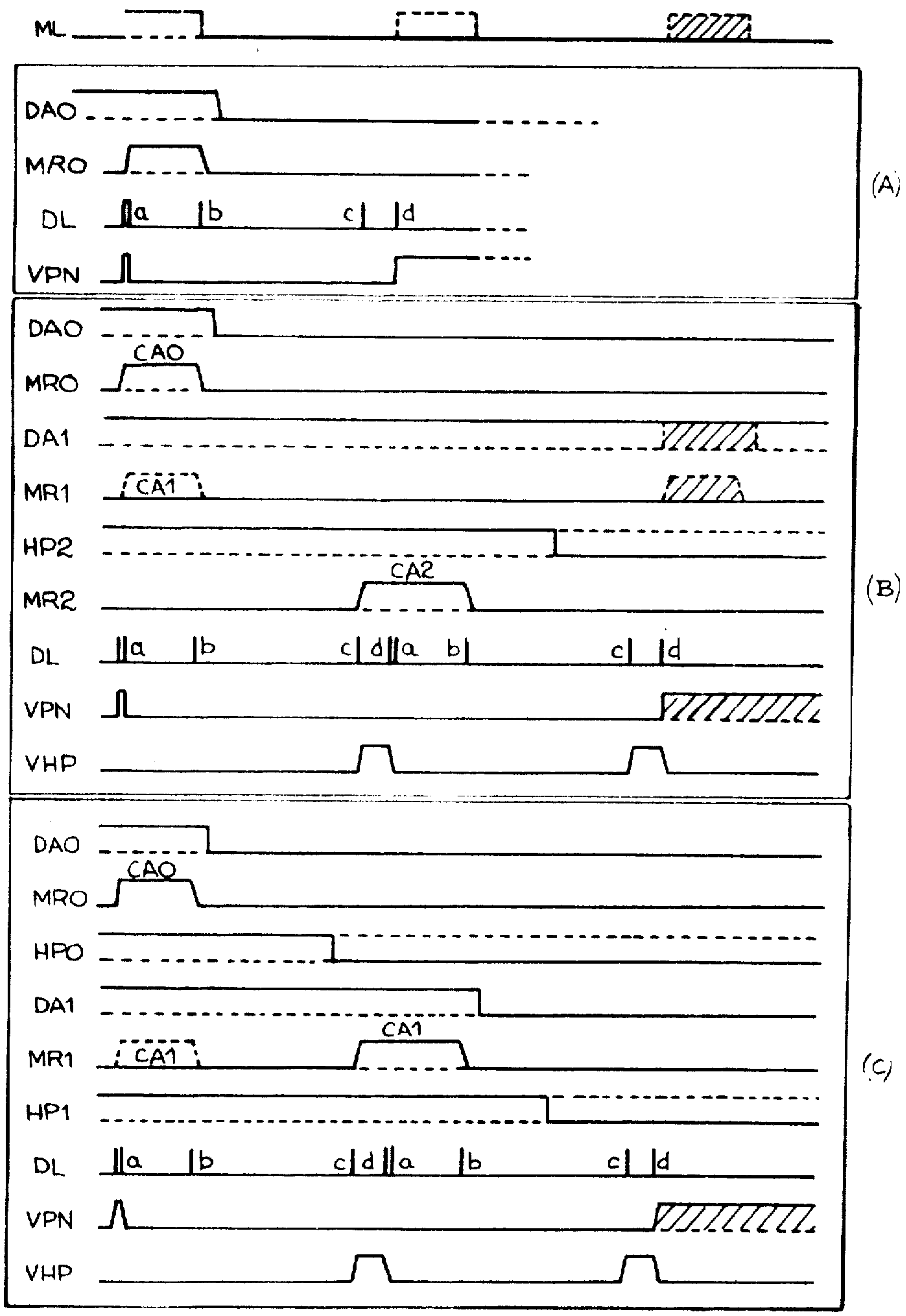
FIG. 3 is a series of waveform explanation of the operation of the interpretative device of FIG. 2; and, FIG. 4 is an example of the circuits which generate the signals of store access channel calls in a peripheral multiplexing unit in the system of FIG. 1.

Group (A) of the diagrams of FIG. 3 illustratively concerns the case of a "normal" access call appearing for instance on the input DA0 of FIG. 2, none of the other inputs of the device being activated. This call was initiated during the former cycle of operation of the store and is waiting for service. In the former cycle, at the time instant 500 ns thereof, the tap *d* of the delay line DL was activated and controlled the one-digit store BPN which has reversed its condition. Such a change of condition necessitated about 10 nanoseconds (in order to simplify the diagrams, such times of change of condition of the one-digit stores in FIG. 2 have not been represented). The voltage on the bus line VPN returns to its true level for unblocking the circuits 5N at the time instant when ML is true on gate 71. MR0 is consequently activated through 5N0, which is then unblocked and through circuits 60, 70, 71 and 73, the delay line DL is activated. From either the output from the tap *a* or the change of condition of the output of the inverter I0, according to whether it is the one or the other voltage which is first applied to bus line VPN, the circuits 5N are blocked which inhibits the interfering action of a further call to the device, if any. BPN is reset for preserving the circuits 5N in their blocked condition up to the time instant of the cycle whereat tap *d* is activated. The activation of MR0 has applied a true level on line CA0, which activates the access channel A0 in the store for servicing the call from UC0. This servicing occurs within a time interval slightly lower than the time interval *b* after the activation of the delay line, and it is at this time instant *b* that the store will reset signal ML to a false value. The calling unit UC0 will thereafter cancel its call for access to the store. At the time instant *c* of the cycle, the one-digit store BHP is set but this will not have any result since none of the inputs of the device carries a high priority call signal. At the time instant *d*, BHP is reset and BPN is set. The device is then ready to receive a further call.

Group (B) of the diagrams in FIG. 3 concerns a typical example of servicing a high priority access call. Three calls for store access are present: normal access calls on the inputs DA0 and DA1, high priority access call on the input HP2 (DA2 is not shown but assumed to exist as said in the embodiment shown in FIG. 2 — it will not exist in a circuit arrangement wherein circuits 5P do not receive the signals DA). When ML turns true, time instant d of the former operative cycle of the store whereat the circuits 5N are unblocked, the one-digit stores MR0 and MR1, and casually MR2, are set. Only the line CA0 is brought to a true condition as the lines CA1 and CA2 are maintained in a false condition through the inverters I1. It is consequently the call for normal access at DA0 which is serviced, from the action of the normal access hierarchy. Thereafter, if no high priority access call were present, it would be DA1 which would be serviced after the time instant *d* of the operative cycle initiated by DA0. However, there is a high priority access call on DA2 and, at the time instant *c*, BHP is set and the line VHP turned to its true level. Consequently MR2 is activated through 5P2 and the line CA2 is turned to its true condition. Through the output of 74, ML is maintained at its false level so that, at the time instant *d*, the signal HP2 through 62 and 70 finds circuit 72 unblocked and consequently immediately re-initiates a cycle of the delay line DL. The activation of MR2 maintains a false level on line VPN and the call DA1 is thus inhibited and must wait the next further cycle of the store to be serviced, time interval *d* of said further cycle in case HP2 ends prior to said time instant *d* or, more accurately, prior the time instant *c* of said high priority call servicing cycle.

Group (C) of the diagrams of FIG. 3 concerns the case of two simultaneous high priority access calls on two inputs HP0 and HP1 for instance. This example is intended to show that, when two high priority access calls are conflicting, the hierarchy for the normal access calls operates for servicing the high priority access call corresponding to the higher rank in said hierarchy to the high priority access call corresponding to a lower rank in said hierarchy (provided HP0 disappeared prior to the time instant c of the cycle wherein HP0/DA0 is being serviced).

Once initiated, the servicing of a high priority access call in maintained, from operative cycle to operative cycle until the signal of said call disappears on the input of the interpretative device.

From the above three examples may be derived any further condition of conflicting normal and high priority store access calls. When, in a device, the activations at HP are not imperatively concurring with corresponding activations at DA , the servicing of any high priority call cannot be initiated in the absence of a normal access call condition but such a normal access call will always be present because in the numerical data processing system for which the present invention is provided, one such normal access call exists at each and any operative cycle of the general large capacity store.

The generation of the high priority access calls from the exchange units will now be described. First consideration is given to the case of a direct exchange unit such as shown in FIG. 1 for the peripheral equipment P7. In such exchange units, a buffer store MT conventionally exists, together with an address decoder circuit DMT for such a buffer store. The normal operation of such a buffer store may be summarized as follows: the buffer store is of a capacity equal to *n* addresses, from 1 to *n* and for instance consists of a shift register. The transfers of data, or exchanges, are made in a read-in as well as in a read-out operation by filling the buffer up to an address *j* which may be selected, in an embodiment according to the present invention as a criterium for initiating a high priority access call because, as soon as this level *j* is exceeded in the buffer store, there is a risk of information loss if the transfer operation cannot be speeded up, as well from the store to the peripheral or from the peripheral to the store M. The high priority access call forming circuit then merely consists of a gate GHP controlled from the *j* output of the decoder circuit DMT of the buffer store MT for application of a battery voltage to the calling line HP7. Such a condition (i.e. the *j* output to a true level) persists until the buffer store content is reduced to a lower value than the one activating said *j* output.

In the central units and in the direct exchange units, there normally exist such means as shown at GDA for initiating the normal access store calls. Since these means are conventional, they will not be further detailed herein.

The generation of the store access call signals for the multiplexing exchange units will be described with reference to an example shown in FIG. 1 and to detailed parts thereof shown in FIG. 4. Such a multiplexing unit actually includes two exchange units UE1 and UE2 which partake the store access call lines DA2 (normal) and HP2 (high priority). Unit UE1 connects the three peripheral equipments P1, P2 and P3 to the general store M and unit UE2 similarly connects the three peripheral equipments P4, P5 and P6 to the said store M. Such connections are made through connecting units UL1, UL2 and UL3 for the peripheral equipments P1, L2 and P3, and through connecting units UL4, UL5 and UL6 for the peripheral equipments P4, P5 and P6.

Each one of the exchange units UE1 and UE2 first includes three channels respectively attributed to the connecting units. These channels are detailed for one of the exchange units in part (A) of FIG. 4. FIG. 4 details the circuit arrangement generating the normal access calls DA and in part (B) of said figure, is details the circuit arrangement generating the high priority access calls in ccoperation with the connecting units UL connected to the exchange unit concerned. In each of the connecting units UL is provided a circuit which is the same kind as the one above described for a direct exchange unit. The three signals are applied, in a logical OR relation, to the actual high priority access generator means of the multiplexing unit, as shown at HPL. As the units partake the call lines DA and HP, it is further necessary that, in each one of the units, be formed a line occupation signal AP. The three channels of an exchange unit issue a group of three signals D, FIG. 1, and a further group of three signals applied at Ed on the high priority access call generator (FIG. 4 (B)).

Figure 4:
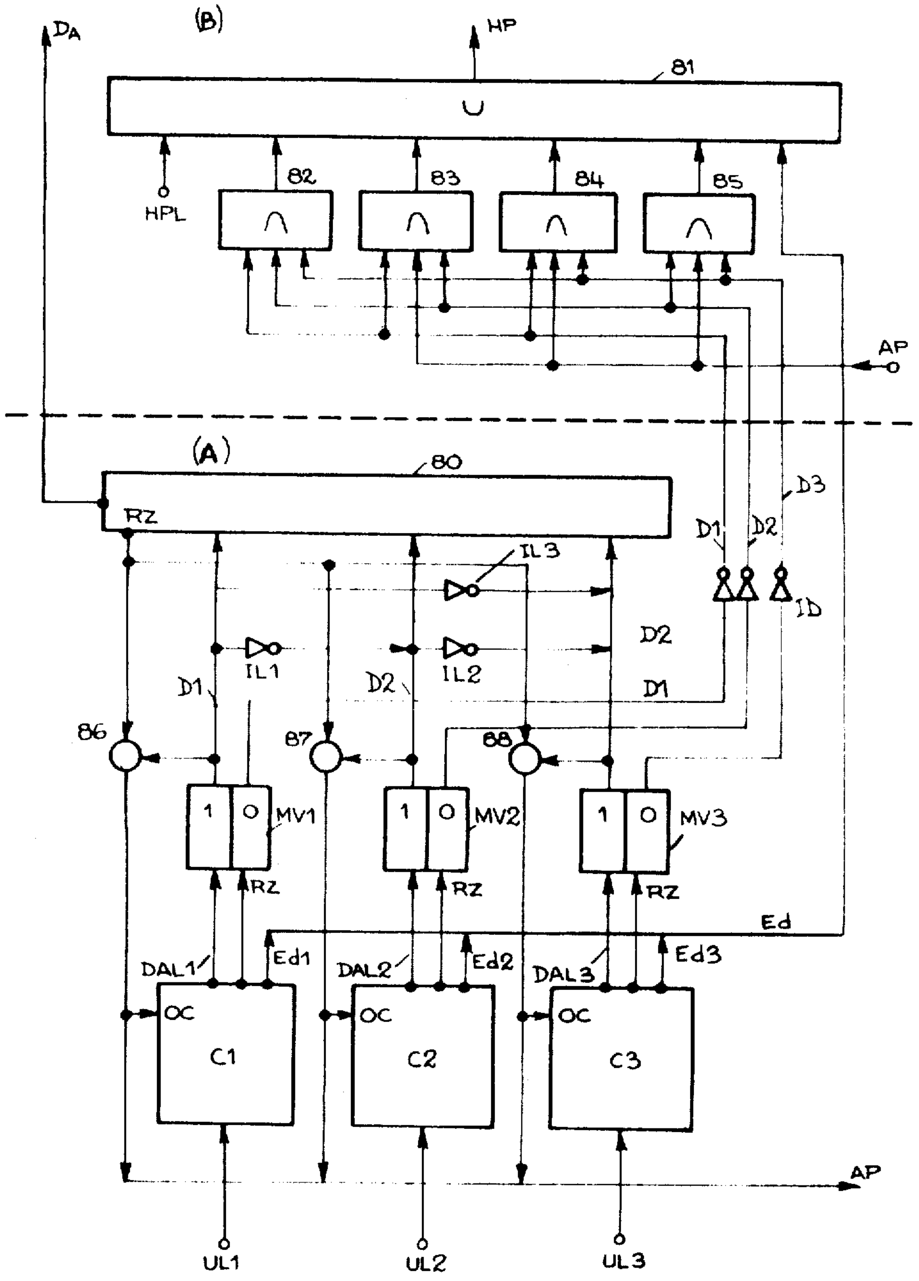

With reference to FIG. 4 which, illustratively, relates to the exchange unit UE1, the three channels C1, C2 and C3 are only shown in block form. Such channels issue, when necessary and in a conventional form, signals requesting a normal access to the store, DAL1, DAL2, DAL3 to respective one-digit stores MV1, MV2, MV3. The outputs of said one-digit stores are respectively D1, D2 and D3. They are connected to inputs of a common logical circuit 80 which delivers, inter alia, the normal access call DA when at least one of the one-digit stores MV is activated. Each time such a DA signal issues from 80, a further signal Rz is applied back to the channel from which originated the request of a store access call through a transfer stage controlled to conduction from the one-digit store MV which has been activated. MV1 controls the transfer stage 86, for channel C1, MV2 controls the transfer stage 87 for channel C2 and MV3 controls the transfer stage 88 for channel C3. Application of a signal Rz to a channel turns it to occupation. The outputs of the three stages 86, 87 and 88 are mixed to form a signal AP denoting the occupation of the access call line from UE1 to the other exchange unit UE2.

Obviously, conflicting conditions may exist in the three channels on a request for a connection to the store M. First, a hierarchy is created for the outputs of the one-digit stores MV1, MV2 and MV3 by means of the inverters IL1, IL2 and IL3 in the very same fashion as described for the hierarchy in the interpretative device. Further, means must be provided for determining whether one of the requests will be of the "high priority" kind in accordance with the invention. This is done by the circuit arrangement (B): an OR-circuit 81 receives a signal HPL consisting of the addition of the high priority access request signals from the connecting units UL1, UL2 and UL3, and also receives the output signals of four AND-gates 82 to 85 the inputs of which are derived as follows:

Three signals D1, D2 and D3 are derived from the outputs of the one-digit stores MV1, MV2 and MV3 from an inversion at ID of the output conditions of said stores. A signal denoting whether or not lines DA2 and (or) HP2 are occupied by the other exchange unit UE2 is applied through input AP2. AND-gate 82 receives the three signals D1, D2 and D3; AND-gate 83 receives the three signals D1, D2 and AP2; AND-gate 84 receives the three signals D1, D3 and AP2; AND-gate 85 receives the three signals D2, D3 and AP2. When, consequently, the three channels C1, C2 and C3 simultaneously request a connection to the store M, circuit 82 issues a signal requesting to 81 the generation of a high priority access call signal in order to take such a conflict into due account from an acceleration of the exchange between the concerned peripherals and the store M. When both channels C1 and C2 request a connection to the store M and when the particular line is occupied by UE2, the signal AP2 being at its true level, it is circuit 83 which applies to 81 a signal requesting a high priority access call, so that the transfer will be accelerated between UE2 and the store M. A similar result is obtained through circuit 84 when C1 and C3 both request a connection and when AP2 is at its true level. A further similar result is obtained when C2 and C3 both request a connection and when AP2 is at its true level, from circuit 85. When two channels of an exchange unit both request connection to the store M and when AP2 is "false," priority will be under control of the hierarchy which has been defined in part (A) as it has been above described. In any case, when a signal HPL is generated in a connecting unit UL, a high priority access call signal HP will always be generated in order to speed up the operation.

Finally, each one of the channels C1, C2 and C3 may conventionally activate a further output Ed1, Ed2 and Ed3 respectively. Activation of one of these outputs indicates the necessity of two successive transfers, in or from the store M, for appropriately collecting the data. In a system according to the invention, the outputs Ed are applied to the OR-circuit 81 for generating therefrom a high priority access call signal HP.

Whereas, in the above described embodiment, the system is so provided as to ensure servicing of the high priority access calls without waiting for the clearence of the store M, and whereas further the access channels are available both for normal and for high priority calls, it must be understood that any other embodiment wherein one, or both, of such particular conditions is not satisfied though having recourse to the described "high priority access" scheme, remains within the field and scope of the invention. Further, high priority access call lines could, if desired, be associated only with part of the processors without departing from the spirit of the invention.

I claim:

1. In a numerical data processing system wherein one of a plurality of processing units is selected for an individual access to a common data storage apparatus on the basis of a hierarchy of priorities wherein each processing unit has a higher or lower priority with respect to the other processing units, each processing unit providing a first access request signal in a first operative condition thereof and a second access request signal in a second operative condition thereof, the combination comprising:

a first plurality of controllable circuits for the reception of the first access request signals;

a second plurality of controllable circuits for the reception of the second access request signals;

a first plurality of one-digit stores respectively settable from output conditions of the controllable circuits of the said first plurality of circuits;

a second plurality of one-digit stores respectively settable from output conditions of the controllable circuits of the said second plurality of circuits;

each one-digit store of the said first and second pluralities having an output connected to an access activation line to said common apparatus;

means in each one of said two pluralities of one-digit stores for inhibiting from an activated output of a one-digit store the activation of the access activation lines connected to other one-digit stores which are settable from controllable circuits receiving access request signals from processing units of lower priority in said hierarchy than the processing unit from an access request signal of which said one-digit store output is activated;

monitoring cycle signal generator means controlling, to signal transmitting condition, the controllable circuits of said first plurality during a first time interval of a monitoring cycle and controlling, to signal transmitting condition, the controllable circuits of said second plurality during a second time interval of a monitoring cycle;

and means inhibiting the controllable circuits of said first plurality during said first time interval of a monitoring cycle when a one-digit store of said second plurality has been set during the said second time interval of the preceding monitoring cycle.

2 In a numerical data processing system wherein one of a plurality of processing units is selected for an individual access to a common data storage apparatus on the basis of a hierarchy of priorities wherein each processing unit has a higher or lower priority with respect to the other processing units, each processing unit providing a first access request signal in a first operative condition thereof and a second access request signal in a second operative condition thereof, the combination comprising:

a first plurality of controllable circuits for the reception of the first access request signals;

a second plurality of controllable circuits for the reception of the second access request signals;

a corresponding plurality of one-digit stores each of which being settable from output conditions of one or the other of a pair of controllable circuits receiving their respective access request signals from the same processing unit, each one-digit store having an output connected to an access activation line to said common apparatus;

means for inhibiting, from an activated output of a one-digit store, the activation of the access activation lines connected to other one-digit stores which are settable from controllable circuits receiving access request signals from processing units of lower priority in said hierarchy than the processing unit from an access request signal of which said one-digit store output is activated;

monitoring cycle signal generator means controlling, to signal transmitting condition, the controllable circuits of said first plurality during a first time interval of a monitoring cycle and controlling, to signal transmitting condition, the controllable circuits of said second plurality during a second time interval of a monitoring cycle;

and means inhibiting the controllable circuits of said first plurality during said first time interval of a monitoring cycle when one of said one-digit stores has been set during the said second interval of the preceding monitoring cycle.

3. Combination according to claim 2, wherein said monitoring cycle signal generator means comprises cycle initiating first and second means respectively actuated during the said first and second time intervals, said first means being responsive to the coexistence of an activated output condition from the said first plurality of controllable circuits and of an availability signal from the said common apparatus, said second means being responsive to an activated output condition from the said second plurality of controllable circuits, and means resetting the one-digit stores at a time instant intermediate between said first and second time intervals.

4. Combination according to claim 3, wherein said monitoring cycle signal generator means comprises first and second bistable members respectively controlling when actuated a signal transmitting condition of the controllable circuits of the said first and second pluralities, means applying to the first bistable member an actuation signal at a time instant near the end of a monitoring cycle and a reset signal at a time instant next to the activation of said cycle initiating first means, and means applying to the second bistable member an actuation signal at a time instant delayed over the said resetting time instant of the one-digit stores and a reset signal at a time instant near the end of a monitoring cycle, and wherein said means inhibiting the controllable circuits of the first plurality comprises inverter means receiving an OR association of the outputs of the one-digit stores and having its output connected to the output of the said first bistable member.

5. Combination according to claim 4, wherein further means routes the actuation signal of said second bistable member to the said common apparatus as an occupation signal thereof when an output of a controllable circuit of the second group is activated.

6. Combination according to claim 4, wherein said monitoring cycle signal generator means comprises a delay line having an input connected to the outputs of said cycle initiating first and second means and distributed tapped outputs along its length.

7. Combination according to claim 2, wherein each processing unit when in the said second operative condition provides both the said first and second access request signals and wherein each controllable circuit of the said second plurality comprises and AND-gate circuit for reception of the said first and second access request signals from a processing unit.

8. A numerical data processing system comprising in combination:

a large capacity information store including a plurality of information exchange access channels and a plurality of store access calling lines for selective activation of the said channels;

a plurality of processor units, each having a first access request signal line and providing activation of said first line in a first operative condition thereof and each having a second access request line and providing activation of said second line in a second operative condition thereof;

first and second groups of controllable circuits having their inputs respectively connected to said first access request signal lines and to said second access request signal lines;

a plurality of one-digit stores having their actuation inputs respectively connected to the outputs of the said controllable circuits and having their outputs respectively connected to the said store access calling lines;

means inhibiting, from an activation of a one-digit store, the activations of the store access calling lines connected to other one-digit stores of a lower priority in a hierarchy of priorities of the said access channels and calling lines;

cyclically operated control means respectively activating said first and second groups of controllable circuits during a first and a second time interval of an operative cycle thereof and resetting the one-digit stores at a time instant intermediate said first and second time intervals;

means inhibiting activation of the circuits of the first group in an operative cycle following an operative cycle wherein a one-digit store has been activated from an output of a controllable circuit of said second group during the said second time interval; and means controlled from an activated output of a controllable circuit of said first group and means controlled from an activated output of a controllable circuit of said second group, to initiate an operative cycle of the said control means during the said first and second time intervals.

9. Combination according to claim 8, wherein one at least of the said processor units is a program-operated numerical computer, one at least of the said processor units is an exchange multiplexing unit for a plurality of peripheral equipments and one at least of the said processor units is a direct exchange unit for a single peripheral equipment, and wherein program-operated computer units are connected to access channels of a higher priority than the access channels to which are connected exchange multiplexing units which, in turn, are connected to access channels of a higher priority than the access channels to which are connected the direct exchange units.

10. Combination according to claim 9, wherein each exchange multiplexing unit comprises as many channels as there are peripheral equipments connected thereto, first and second access request lines from each channel respectively activated in a first and a second operative condition in said channel and an exchange maintenance request line from each channel activable during an exchange condition of said channel, a priority hierarchy determining arrangement having its inputs connected to the said first access request lines from said channels and having its output connected to the first access request signal line of the processor unit, means responsive to simultaneous activations of the first access request lines from said channels, means responsive to an activation of said second access request lines from said channels and means responsive to the OR-combination of said simultaneous activation responsive means, of said second access request line activation responsive means and of activation of an exchange maintenance request line and having its output connected to the second access request line of the said processor unit.

11. Combination according to claim 10, wherein a pair of first and second access request signal lines is shared by a group of exchange multiplexing units, means generating a signal of occupancy of the shared lines is provided in each exchange multiplexing unit, and applying the said signal of occupancy as a further control signal to the said simultaneous activation responsive means of the other exchange multiplexing units of the group.

* * * * *